United States Patent [19]
Gerlach

[11] 3,984,881
[45] Oct. 12, 1976

[54] SOLAR PANEL

[75] Inventor: Richard K. Gerlach, Rolling Hills Estates, Calif.

[73] Assignee: CaTel Manufacturing Inc., Monrovia, Calif.

[22] Filed: Dec. 19, 1974

[21] Appl. No.: 534,368

[52] U.S. Cl. .................. 4/172; 4/172.11; 4/172.12; 126/270; 126/271
[51] Int. Cl.² ............... E04H 3/16; E04H 3/18
[58] Field of Search ......... 4/172.12, 172.14, 172.11; 126/270, 271

[56] References Cited
UNITED STATES PATENTS

| | | | |
|---|---|---|---|
| 895,761 | 8/1908 | Huntoon | 126/271 |
| 2,580,555 | 1/1952 | Kroeger | 4/172.14 |
| 3,072,920 | 1/1963 | Yellott | 4/172.12 |
| 3,411,163 | 11/1968 | Myers, Jr. | 126/271 X |
| 3,466,119 | 9/1969 | Francia | 126/270 X |
| 3,620,206 | 11/1971 | Harris, Jr. et al. | 126/271 |
| 3,893,443 | 7/1975 | Smith | 126/271 |

FOREIGN PATENTS OR APPLICATIONS 13,780 6/1928 Australia .................. 4/172.12

OTHER PUBLICATIONS

Solar Heating for Swimming Pools, An Interim Report by S. R. Robson, B.E., New Zealand Engineering, pp. 298–299, Sept. 1956.

*Primary Examiner*—Henry K. Artis
*Attorney, Agent, or Firm*—William W. Haefliger

[57] ABSTRACT

Conservation of energy of a swimming pool is provided by an attractively colored polyethylene panel secured to a circular frame which panel cover and frame are stable, and will not disintegrate due to direct rays of the sun. The panel passes and traps the heat of the sun rays during the day and maintains a pool cover to prevent substantial loss of heat and thereby retain the heat of the pool. The absorption of heat and reduction of evaporation is effective primarily to reduce fuel of the pool heater and also reduces consumption of chemicals and water.

16 Claims, 10 Drawing Figures

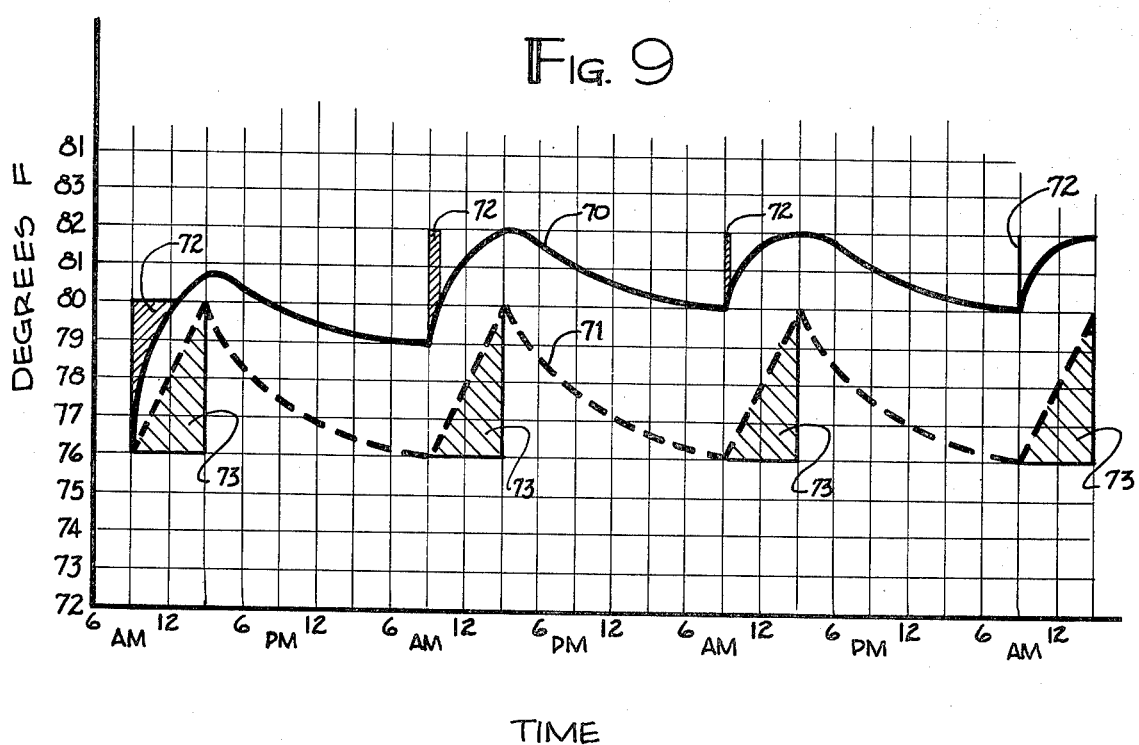
FIG. 9
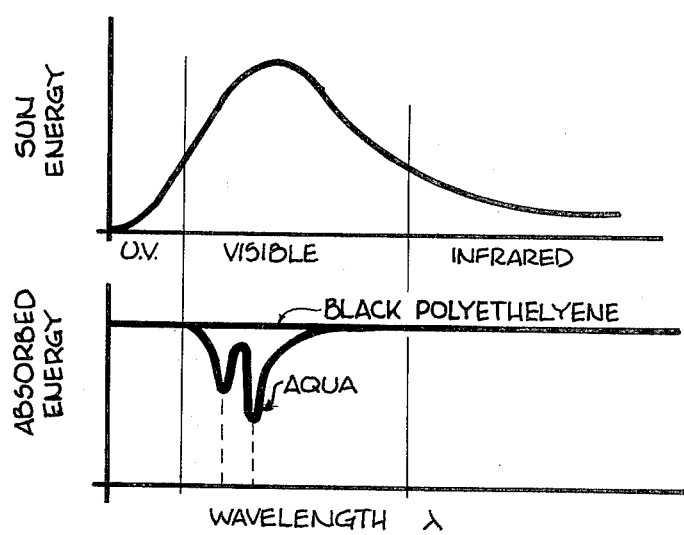
FIG. 7
FIG. 8
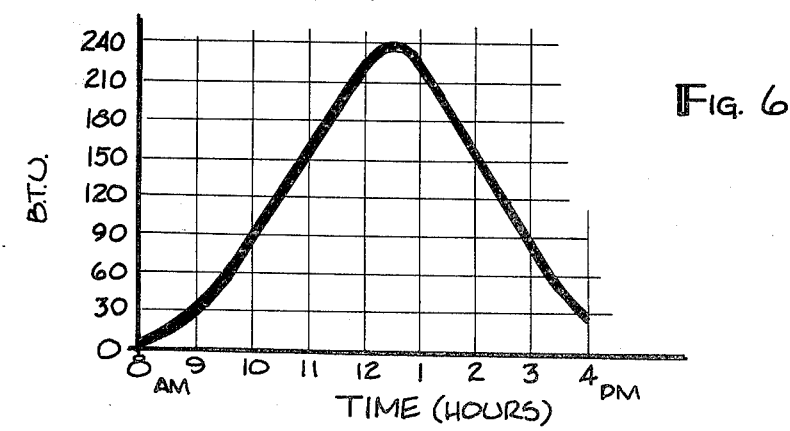
FIG. 6

SOLAR PANEL

BACKGROUND OF THE INVENTION

While a pool cover that extends over the entire pool surface can maintain water temperatures well into the 80's and 90's, they are also bulky, unsightly, and difficult to use and store. Further, they can be dangerous for small children or animals which can be trapped underneath.

SUMMARY OF THE INVENTION

Solar panels provide the same heat retention qualities of a pool cover without the disadvantages. They can be left in the water while the pool is being used and enjoyed by the entire family. Further, solar panels are totally safe and attractive. Solar panels can be stacked easily and neatly at poolside and are impervious to decay and require no special care. A solar panel, while utilizing the sun under conditions hereindescribed, is not dependent or necessarily utilizing the sun in its operation.

BRIEF DESCRIPTION OF THE DRAWINGS

FIGS. 6, 7, 8 and 9 are graphs for illustrating the operation of the present invention.

DESCRIPTION OF THE PREFERRED EMBODIMENTS

Figure 1:
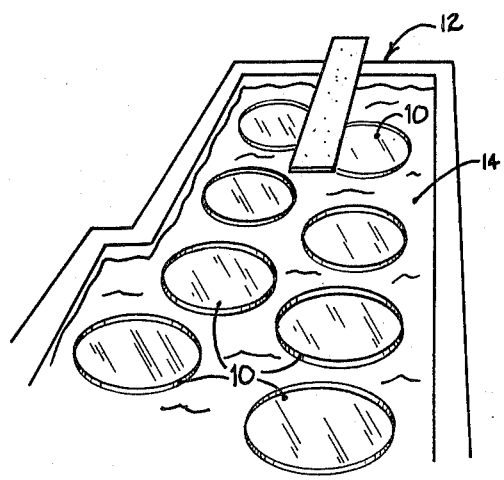
FIG. 1 is a pictorial view of a swimming pool having solar panels of the preferred embodiment of the present invention disposed over the surface of the water.

Referring now to FIG. 1, a plurality of solar panels 10 are shown as solar panels floating horizontally on the surface 14 of the water in the swimming pool 12. Distributing the solar panels about the surface of the pool as shown in FIG. 1, for example, the solar panel 10 becomes attractive, having the appearance of lily pads about the pool surface 14. More important, the solar panels 10 collect heat energy received over the individual panel covers during the day; and also where the solar panels are located. In addition, the panels provide individual covers for the pool surface 14 during cool night-time temperature since solar panels 10 retain the heat in the pool water. Equally important, and possibly most important, less heat loss is produced by evaporation. By reduction of evaporation, not only is fuel saved, but fuel for heating the pool water is substantially reduced along with a reduction in need for pool chemicals and water. The actual amount of water loss due to evaporation is substantial, without panel 10.

Of course, the highest temperature of a "spa" can be maintained by a minimum of heating fuel by the "spa" water surface when not in use.

Figure 3:
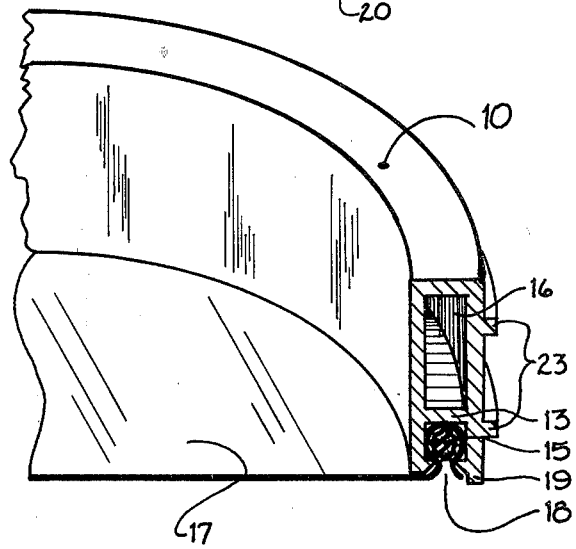

As shown in FIG. 3, the solar panel 10 is preferably round to give it maximum self-supporting strength across thereof due to the known physical strength of the circle over other structural configurations. The structural strength solar panel 10 provides sufficient rigidty for handling and use in a swimming pool 12 and other bodies of liquids.

The polyethylene cover 17 is made taut as it is secured to the rim of novel construction in which a semi rigid rectilinear-tubular structure provides the corresponding enclosed area 16 and bead or spline retaining seat or slot 18 is provided. A tapered structural area 18 for securing the cover 17 in the slot 18 and about the periphery. The square tubular structure along with the separating peripheral wall 13 not only provides greater rigidty but decreases the weight of the rim so that the solar panel 10 is lighter than water; i.e. the solar panel 10 will always float with or without the benefit of air trapped between the cover 17 and the water surface 14 or without use of surface tension.

The panel 10, therefore, has two peripheral sections, enclosed rectilinear section 16 providing a trapped air chamber and a cover retaining section 18 for securing the cover 17 about the rim, by spline 15.

Figure 2:
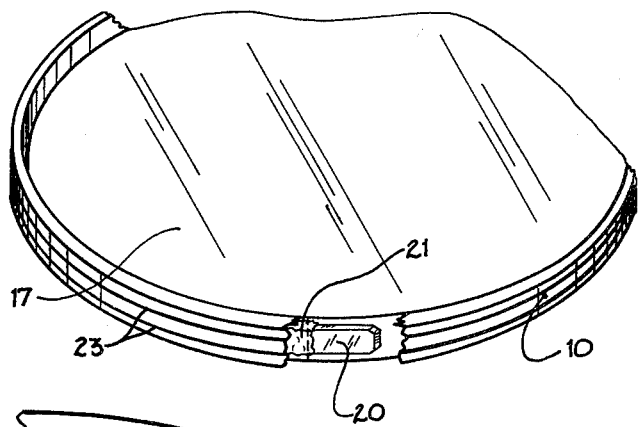
FIGS. 2 and 3 are perspective sectional views and partially broken away, showing the solar panel including internal construction and the joining of the rim providing novel features of the present invention.

The rim is formed from a continuous length of plastic, such as type ABS, which is preferably joined by a peripherally extending member or aluminum slug 20 which projects into the ends of rectilinear end openings of the rim, as shown in FIG. 2 by the area broken away. The ends of the rim are secured by the slug 20 and in the adjacent inner peripheral rectilinear opening 16 and silicone rubber 21, for example, which is inserted into the open ends of the newly formed loop or rim. The silicone rubber 21 has the advantage of vulcanizing at room temperature and absorbs moisture to cure.

Another important feature of the solar panel 10 of the invention is the projection or tab 19 for protection of the polyethylene cover or sheet 17. The projection can be small, e.g. 0.030 to 0.050 inches or 30 to 50 mils. The tab 19 acts to protect the sheet 17 from the surrounding deck of the pool 12, for example, or other surface when the solar panel 10 is laid flat on the surface of the deck or slid across the deck, for example.

As for other important details of the invention, the solar panel 10 is circular or round to decrease cost snd provide a more stable structure for reasons discussed earlier. Further, the circular structure is simpler in construction. It is simpler to make round panels 10 uniform in size and in general, the solar circular is more aesthetic, appearance being important in inducing sales and successful manufacture.

In a sense, the solar circular panels 10 having approximately 5 foot diameter is preferred, i.e. 4 to 6 feet diameter panels for an average size pool 12, approximately 15 feet by 30 feet. Smaller solar panels 10 make retrieval difficult when the desired coverage is provided. Further, the appearance of many, many smaller panels 10, e.g. less than 4 feet diameter, is not aesthetic. On the other hand, larger panels, i.e., larger in diameter than 6 feet, are disproportionally more difficult to handle. The larger panel therefore, requires more material for stiffness of the rim which not only makes handling difficult, but the ease of placement for coverage of the pool 12 is made difficult.

The material of cover 17 and the rim of solar panel 10 is ultra-violet stable having a density less than 1 and capable of being cleansed quickly and easily. The material is not unduly affected by solvents and other chemicals and has excellent material strength to resist puncture, tearing, cracking or other destruction forces.

The solar panels 10 have a acrylonitrile butadiene syrene (ABS) which is a sturdy stable material providing the desired stiffness to weight ratio to withstand engagement with a pool sweeper. The rim in combination with the film cover also has a specific gravity less than 1 and therefore floats. The plug 20 (FIG. 2) is of aluminum material to provide an extremely strong joint, stronger than other sections of the rim while providing for ease of fabrications and relatively inexpensive. Peripheral lateral projections 23 provide interlocking ridges between adjacent floating panels 10 to prevent wind and the like from causing one panel to move on top of another by inhibiting vertical movement of the rims over one another, i.e. interlocking.

In operation on hot days, the pool 12, as shown in 5, will rise 2°, 3°, or 4° per day and cool about 2° at night such that a net gain of more than was lost will cause the temperature to rise above the heater setting of 80° and the heater need not operate to maintain the described temperature, as above. On cooler days and nights there may be a net loss.

If the system turns on at 9 A.M. and off at 4 P.M., as shown by curve 70 in FIG. 9, (FIG. 6 shows this is optimum time for solar heating), the heater will operate for a period 72 in the morning to make up for the net loss from heat gathered the day before and then lost during the subsequent night. This represents the advantages of the solar panels 10, a system of the present invention in which solar energy is used to heat a swimming pool, for example. Natural recirculation of water by pool filtering system removes warm water at the surface and pumps it back into the main body.

As shown graphically on FIGS. 7 and 8, the color of the preferred solar panel is blue-green (aqua) to provide the the preferred advantages over the other colors. A black surface of a solar panel provides greater absorption of light and heat to the surface water of the pool but does not provide the desired attractiveness to the pool 12 as other colors such as blue-green. It should be noted that absorption of the sun's rays by the solar panels is transferred to the surface water of the pool to heat the pool water at the surface.

The reflection of blue-green (aqua) for the aqua appearance is only about 20% of the energy in the sunlight spectrum. Aqua is more attractive and 80% energy absorative compared to black which is 100% absorbative as a reference. Thus, aqua is 80% effecient and the choice of colors is dependent upon individual choice of efficiency over esthetics.

The day to day operation of the exemplary pool with the preferred panels 10 of the present invention is illustrated by the graph of FIG. 9. As illustrated by solid curve of this graph, the pool heater becomes a temperature stabilizer to maintain the temperature, i.e. protect from lower temperature on colder days but avoid unnecessary operation of the heater when the sun is effective for heating and maintaining the desired temperature by panels 10. The resulting operation is that the pool heater operates in the morning, i.e. area 72 in the graph of FIG. 9, according to the temperature of the previous day to conserve energy and fuel. On hot days, the pool water 14 will rise 2°, 3°, or 4° with the heater set at 80° for the day and to allow the pool water to cool about 2° at night which results in a net gain that will cause a temperature rise above the heater setting of 80°. The result of the gain is the heater does not operate on the latter day while on cooler days and nights there may be a net loss.

While the system is in operation at 9:00 A.M. and shuts off at 4:00 P.M. for example, the heater will only remain on long enough in the morning to make up the net loss from heat gathered the day before and then lost on the subsequent night. The operation of the system in this manner offers considerable savings to the pool owner as shown by decreased heating in FIG. 9 by decreasing areas 72.

Operation of a typical pool of the preferred embodiment is illustrated by the graphs in FIGS. 5 through 9; assume a pool with 200,000 lbs water, i.e. 26,000 gals; 630 sq. ft. surface area 14.

Pool water temperature rises 0.83° per hour (open pool) and 1.9° per hour mid-day, with solar panels. This assumes having 63.5% coverage of the pool surface. Assuming the mid-day sun provided 240 BTU per hour per sq. ft., the heat input to the pool equals 96,000 BTU per hour at mid-day. A valid BTU estimate for 9 to 4 P.M. is 96,000 BTU per hour for four hours, which is 384,000 BTU.

Total rise in water temperature = 384,000/200,000 = 1.92°for the day.

Experience shows this is the case: 2° lost at night and 2° gained during the day where the night temperature drops to a low of approximately 60° and the day temperature rises to a high of 75° to 80°.

In an area of warmer temperature, pool 14 produces a net rise of 6° to 8 days with 60% solar panel coverage of the water 10, i.e. 75° to 81°. Without solar panel coverage of 60%, it will produce a loss under the same conditions which is lower by 5°F (1 million BTU — a loss of about $1.20 in gas).

When the solar panels 10 are placed in an unheated pool, there will be an increase in temperature of up to one or more degrees in the pool 12 each day depending upon weather conditions and coverage by solar panels 10. A one degree variance in the temperature of the water will require heating that will increase fuel cost by approximately 10%.

In operation, heat conduction of the polyethylene film 17 is indicated by the heat differential rise at the film surface wherein the coefficient of heat flow is 2.4 BTU per hour per sq. ft. per °F. For example, the heat flow of the film that is 6 mils in thickness and 1 sq. ft. is 1°F for 400 BTU (British Thermal Unit) per hour. The above closely approximates the condition that the sun produces at mid-day on a typical day in a warm climate, e.g. Southern Calif. The heat conduction in the hot desert can double the foregoing to provide a 2°F rise above the surface water temperature. It should be apparent that this minimal rise in a bright sun prolongs the life of the polyethylene.

Figure 4A:
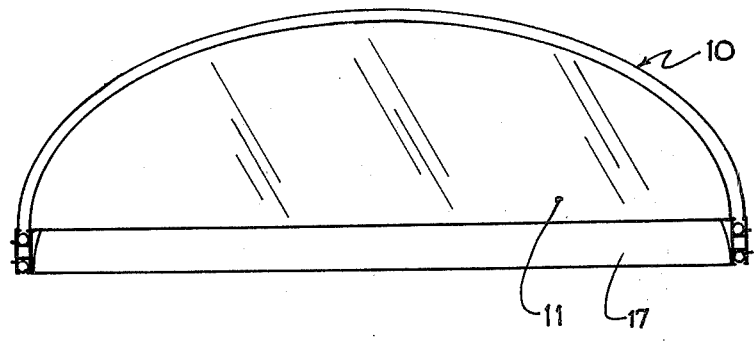
FIGS. 4A and 4B are sectional views showing an alternate preferred embodiment of the present invention to show the novel structural features including spaced films providing an enclosed layer of air.
Figure 4B:
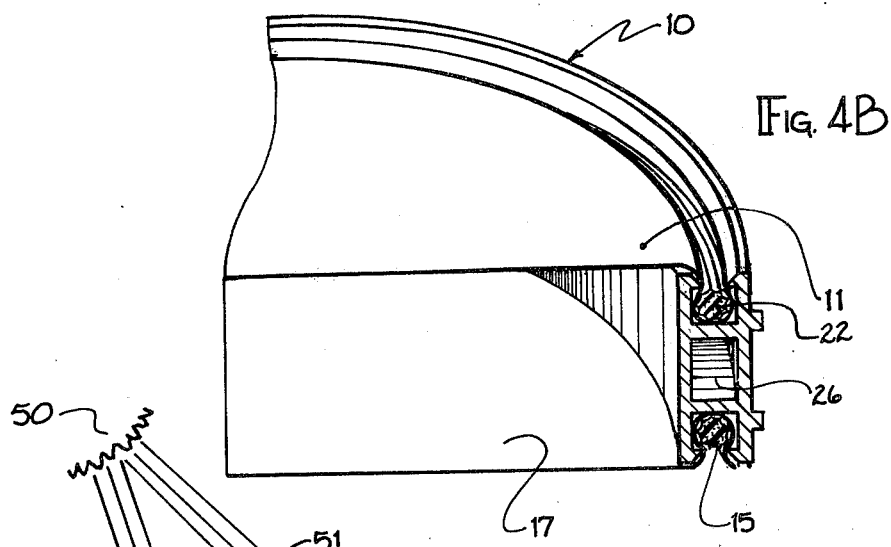

Referring to FIGS. 4A and 4B, the alternate embodiment is a solar panel 10 having parallel, spaced transparent and opaque films 11, 17. As shown by the detail in FIG. 4B, polyethylene films 11, 17 are secured taut by retention by splines 22, 15, respectively, in upper and lower peripheral seats or slots of the hollow rim. The closed rectilinear peripheral enclosure 16 is located between the rim seats, and forming projections of the sides of peripheral enclosure 26. Outer peripheral flanges or projections 14 are also provided on the alternate embodiment for the purpose described supra.

In operation of the alternate embodiment of FIGS. 4A, 4B, any warm air moves to the top of the layer of air space or air chamber formed between films 11, 17 to be cooled by radiation and external air currents. Although this operation may assist at night, i.e. by convection; it produces radiation of heat to the air above, i.e. clear plastic materials radiate in the absence of a coating. Evaporation and radiation are concurrent always in the absence of panels 10.

A disadvantage of the solar panel 10 of FIGS. 4A, 4B is that it is delicate by comparison and unmanageable e.g. if a hole in one of the plastic films allows water to enter between films 11, 17. If thicker film materials are used for "green house" effect the panels become too costly. Also, hot air between films 11, 17 derived from direct rays of the sun keeps the heat of the direct rays from reaching the water in the pool.

Among the most important features of the solar panels of the present invention are the reduction of evaporation and reduction in need for addition of chemicals. This was noted by the significant reduction of water added and chemicals required. For example, if two-thirds of the pool surface is covered by solar panels 10 water, evaporation is reduced by two-thirds and consumption or need for chemicals is reduced by two-thirds; e.g., chlorine (Cl) and hydrochloric acid (HCl).

Expressed in terms of area, the pool water surface area is effectively reduced from 630 sq. ft. to 210 sq. ft. in so far as the loss of water and chemicals in the pool 12 (FIG. 1).

Figure 5:
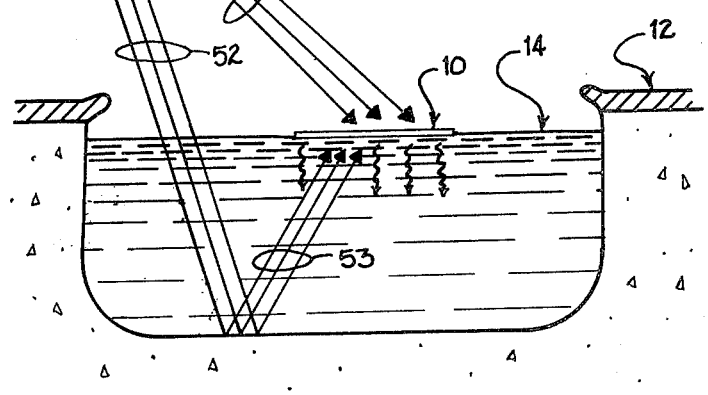
FIG. 5 is a sectional view showing a cross section of the swimming pool to illustrate the operation of the solar panel of the invention in the sun.

While the solar panels 10 use the heat energy of the direct rays 51, 52 of the sun 50 to heat the pool 12, as shown in FIG. 5, it is not the only or main function of the solar panels 10. The reduction in fuel consumption by the pool heater is primarily the result of reduction in heat loss of the water 14 by reduction of evaporation of the water.

FIG. 5, however, illustrates the operation of the solar panels 10 to utilize the direct rays 51, 52 of the sun 50 to heat the water 14 in the pool 12. As described supra, the solar panels 10 absorb the direct rays 51 of the sun 50 and absorb any rays 53 of the sun which are reflected to the undersurface of the panel 10 on the water 14.

Referring now to FIG. 9, in a typical operation of the solar panels 10 of the present invention is indicated by the solid curve 70 and the dashed curve 71 indicates operation without the solar panels 10. The temperature of the pool water 14 is indicated to be 76° in the early morning from 6 A.M. to 9 P.M. At 9 A.M., the pool heater is started 72 and operates from 2 to 4 hours, i.e. until the water temperature reaches 80° and the heater stops operating, e.g. until 12 A.M.

Between 12 noon and 3 p.m. or 4 p.m., the water is heated by the rays of the sun 50. From 3 or 4 P.M. overnight and until 8 or 9 A.M. of the next day, the water cools 2° to 79° due to decreased evaporation. At this time, the heater starts and operates ½ to 1 hour to provide a temperature rise of only 1° to 80°. By 3 P.M. the energy of the sun's rays raises the pool temperature 2° to 82° from 80° between approximately 9:30 A.M. and 3 P.M.

Again, overnight the temperature of the water lowers 2° by cooling to evaporation. This lowers the temperature from 82° to 80° and the heater operation should not be required under the conditions assumed of a minimum temperature of 80° for normal use.

The typical conditions of the foregoing described operation assumes 60% coverage of the area of the water surface, a wind of less than 5 mph, a high ambient temperature 75° to 80°, a low night temperature 55° to 60°, a morning haze, a clear afternoon and a slight fog in the evening and at night. The conditions are far from ideal for maintaining water temperature by a pool heater and a large amount of fuel would normally be consumed to provide a water temperature of 80° as indicated by the dashed curve 71, showing heater operation in time period 73.

Accordingly, the solar panels 10 reduce the operation of the pool heater to a stabilizer, maintaining the desired temperature on colder days and stand by when the energy of the rays of sun 50 are present for heating. Thus, the pool heater is operative the morning after a day in which the energy of the direct rays of the sun is insufficient to provide for any night cooling.

While preferred embodiments of the present invention have been disclosed, it should be clear that the present invention is not limited thereto, as many variations and additional embodiments will be readily apparent to those skilled in the art. For example, the rim can be round in section and secured to the film 17 by other means to provide a suitable taut cover and sturdy rim structure.

As noted in the "Background of the Invention", one of the main disadvantages of conventional swimming pool covers lies in the fact that they are difficult to use and store. These prior covers most often consist of plastic sheets or strips which in some instances are air injected primarily for providing packing material, i.e. bubble cover. One of these plastic covers, i.e. sheet type, is large enough to cover an entire pool and project over the decking for anchoring the cover, i.e. preventing the cover from falling into the pool or protection against wind.

Prior pool covers, including bubble strips extending the length of the pool, are subject to wind curents that manage to flow under the covers, dislocate or actually move the covers from the pool areas to other areas, e.g. neighbor's yard. These wind currents are of such intensity as to pull the large pool covers from under sand bags, and/or steel pipes and "pick up" the bubble type from the pool and move them before wind like a tumble weed. Most are familiar with the problems of prior art pool covers and no further discussion appears necessary. However, the foregoing does not obviate the need and distinct advantages of a pool cover which are discussed supra.

What is claimed is:
1. In a solar panel assembly adapted to be deployed on a water body surface and to move about on said surface,
   a. a frame in the form of a semi-rigid plastic loop, the frame extending horizontally to extend along and parallel to the water body surface,
   b. a flexible cover sheet extending across a planar area bounded by the frame, the sheet comprising a plastic film one side of which is adapted to contact the water surface,
   c. the frame containing a recess sunk in a side thereof facing in a vertical direction, there being an elongated spline and the sheet having a peripheral portion secured in said recess by said spline,
   d. the space above and below said cover sheet being entirely open, vertically, and
   e. the frame having walls bounding and forming a hollow extending lengthwise internally of the frame, the hollow spaced vertically from said recess and entirely separated therefrom, there being frame walls projecting vertically to form said recess therebetween.

2. the solar panel assembly according to claim 1, in which said film consists of ultra violet stable polyethylene to resist the deterioration effects of the energy in the rays of the sun.

3. In a solar panel unit adapted to be deployed on a water body surface and to move about on said surface,
   a. a frame in the form of a semi-rigid plastic loop, the frame extending horizontally to extend along and parallel to the water body surface,
   b. a flexible cover sheet extending across a planar area bounded by the frame, the sheet comprising a plastic filmm one side of which is adapted to contact the water surface,
   c. said planar area being between about 12 square feet and about 27 square feet, the sheet having a peripheral portion secured to an edge portion of the frame, the overall specific gravity of said unit being less than 1,
   d. the space above and below said cover sheet being entirely open, vertically, and
   e. the frame having walls bounding and forming hollowness located lengthwise internally of the frame, the hollowness spaced from said frame edge portion and separated therefrom.

4. The solar panel unit of claim 3, in which said frame has a generally rectangular cross-section including a larger dimension projecting transverse to the direction of the plane of the sheet cover and a relatively smaller other normal dimension thereby to provide desired stiffness and stability across the width of the panel unit.

5. The solar panel unit of claim 3, and including another like unit, said units interfitting in nested relation.

6. The solar panel unit of claim 3, in which said panel unit is formed from an ultra violet stable polyethylene material.

7. The solar panel unit of claim 3, in which said frame is formed from ABS plastic material.

8. The solar panel unit of claim 3, in which the edge portion of said frame to which the sheet peripheral portion is secured is spaced vertically from said hollowness.

9. The solar panel unit of claim 3, in which the frame includes end means for securing a length of frame material together at the ends thereof and having end openings, said end means comprising a short section of material inserted in the end openings of the length of material and adhesive means securing said short section of material into the ends of the frame.

10. The solar panel unit of claim 3, in which said frame comprises an elongated hollow plastic member, rectilinear in cross section.

11. The solar panel unit of claim 3, in which said frame defines peripheral projections forming a recess for receiving the periphery of the cover sheet, and there being a spline for securing and retaining the cover film taut in said recess.

12. The solar panel unit of claim 6 including a second cover sheet extending across said planar area defined by the frame, and secured to the frame in spaced relation to the first mentioned cover sheet.

13. A solar panel comprising:
   a. a cover film of plastic material;
   b. a frame including means for securing said film to the frame to form a panel bounded by the frame and secured thereto,
   c. the panel including frame means for securing a second cover film disposed parallel to the first film to form an air chamber between said films,
   d. the frame comprising upper and lower peipheral seats and splines for securing and retaining the cover films taut and spaced to provide said air chamber.

14. The solar panel of claim 13, in which openings for the peripheral seats are defined by the frame and spaced by a peripheral frame opening for forming a hollow frame decreasing the weight of the frame to less than that of water.

15. The solar panel unit of claim 3, in which said frame includes a peripheral, outwardly projecting flange for interlocking engagement with one or more adjacent panels to positively prevent one panel from overlapping the other.

16. In combination,
   a. a pool of liquid, and
   b. a plurality of solar panel units floating on said pool and free to move about thereon,
   c. each unit comprising a generally horizontal, semi-rigid frame in the form of a loop and a flexible cover sheet in the form of a plastic film extending horizontally across a planar area bounded by the frame so as to cover pool liquid beneath said cover, the cover peripherally secured to the frame, the frame having walls bounding and forming hollowness located lengthwise internally of the frame,
   d. there being substantial pool surface extent which remains upwardly openly exposed between said floating units.

* * * * *